(12) United States Patent
Chaduc et al.

(10) Patent No.: US 8,888,036 B2
(45) Date of Patent: Nov. 18, 2014

(54) PRIMARY FLIGHT CONTROLS

(75) Inventors: Bruno Chaduc, Eguilles (FR); Boris Grohmann, Bouc Bel Air (FR); Christophe Tempier, Vitrolles (FR)

(73) Assignees: Airbus Helicopters, Marignane Cedex (FR); Airbus Helicopters Deutschland GmbH, Donauwoerth (DE)

( * ) Notice: Subject to any disclaimer, the term of this patent is extended or adjusted under 35 U.S.C. 154(b) by 252 days.

(21) Appl. No.: 13/534,193

(22) Filed: Jun. 27, 2012

(65) Prior Publication Data
US 2013/0168501 A1 Jul. 4, 2013

(30) Foreign Application Priority Data
Jul. 6, 2011 (EP) .................................... 11290312

(51) Int. Cl.
| | |
|---|---|
| B64C 11/00 | (2006.01) |
| B64C 27/68 | (2006.01) |
| B64C 27/64 | (2006.01) |
| B64C 27/625 | (2006.01) |
| B64C 13/50 | (2006.01) |

(52) U.S. Cl.
CPC ............... B64C 27/625 (2013.01); B64C 27/68 (2013.01); B64C 27/64 (2013.01); Y02T 50/44 (2013.01); B64C 13/503 (2013.01)
USPC ............ 244/17.13; 244/194; 244/195; 701/3; 318/563

(58) Field of Classification Search
USPC ........... 244/17.13, 194, 195, 177, 175; 701/3, 701/4, 5; 318/563, 564
See application file for complete search history.

(56) References Cited

U.S. PATENT DOCUMENTS

| | | | |
|---|---|---|---|
| 4,765,568 A | | 8/1988 | Carl |
| 5,670,856 A | * | 9/1997 | Le et al. ......................... 318/564 |
| 5,749,540 A | * | 5/1998 | Arlton ........................... 244/17.13 |

(Continued)

FOREIGN PATENT DOCUMENTS

| | | |
|---|---|---|
| FR | 2603866 A1 | 3/1988 |
| FR | 2761659 A1 | 10/1998 |
| FR | 2771071 A1 | 5/1999 |

OTHER PUBLICATIONS

Korean Notice of the Reason for Rejection Dated Jan. 3, 2014, Application No. 2012-0072461, Applicant Eurocopter and Eurocopter Deutschland GmbH, 6 Pages.

(Continued)

*Primary Examiner* — Christopher P Ellis
(74) *Attorney, Agent, or Firm* — Brooks Kushman P.C.

(57) ABSTRACT

Primary flight controls (10) for main and/or tail rotors (4) of helicopters with electro-mechanical interface between any of fly-by-wire and/or fly-by-light controls and hydraulic servo actuators (8) for control force amplification towards said main and/or tail rotor controls (4). For each of the main and/or tail rotor controls (4) there is provided but one of the hydraulic servo actuators (8), connected by one mechanical linkage (7) to one electro motor (5), said one hydraulic servo actuator (8) being of the type having the one mechanical linkage (7) connected to its input (29) and its output (30) and the one electro motor (5) being of the direct drive type, the position of said electro motor (5) having a reference to said one mechanical linkage (7) and the torque delivered by said electro motor (5) to the hydraulic servo actuator (8) being related to the power consumption of said electro motor (5).

20 Claims, 2 Drawing Sheets

(56) References Cited

U.S. PATENT DOCUMENTS

| | | |
|---|---|---|
| 5,868,359 A | 2/1999 | Cartmell et al. |
| 6,059,225 A | 5/2000 | Vidal |
| 6,772,054 B1 | 8/2004 | Achache |
| 8,534,599 B2 * | 9/2013 | Noll et al. .................... 244/99.2 |
| 2011/0046824 A1 * | 2/2011 | Antraygue ........................ 701/4 |
| 2012/0241563 A1 * | 9/2012 | Chaduc et al. ................ 244/196 |
| 2013/0327896 A1 * | 12/2013 | Mezan .......................... 244/235 |

OTHER PUBLICATIONS

Search Report and Written Opinion; Application No. EP 11290312; dated Nov. 9, 2011.

* cited by examiner

Fig.3

PRIMARY FLIGHT CONTROLS

CROSS REFERENCE TO RELATED APPLICATION

This application claims priority to EP 11 290312.5 filed on Jul. 6, 2011, the disclosure of which is incorporated in its entirety by reference herein.

BACKGROUND OF THE INVENTION (1) Field of the Invention

The present invention relates to primary flight controls for main and/or tail rotors of helicopters with the features of the preamble of claim 1.

(2) Description of Related Art

The known primary flight controls allow transmission of a pilot's commands to the control surfaces of an aircraft to initiate and execute maneuvers of the aircraft during operation. At first these primary flight controls were entirely mechanical transmitting the commands of the pilot from the control stick by means of push and pull rods or cables to the control surfaces of the aircraft. Second generation primary flight controls are having power amplification means to help the pilot transmitting mechanically his commands to the control surfaces of the aircraft. Third generation primary flight controls are having electric systems at the place of the push and pull rods or cables and said electric systems are conceived to transmit electrically the pilot's commands to the control surfaces of the aircraft. Flight control computers in these electric systems define and control the commands to the control surfaces. Said electric systems of the third generation allow a considerable reduction of the operational weight of an aircraft, particularly for civil aircrafts, and an important increase in inherent system safety as said electric systems allow multiple distribution lines contributing to fail-safe redundancy of the primary flight controls. The flight control computers are able to add numeric support to the pilot's commands and subsequently contribute to improved primary flight controls of aircrafts and to improved comfort for the pilot.

As far as helicopters are concerned there are special requirements to the primary flight controls, namely the particularly exigent requirement that not more than one control surface is in control for each degree of freedom of the helicopter and said control of the control surface has to be refitted immediately in case of any malfunction of the primary flight controls to keep control of the helicopter. Additionally—compared to airplanes—helicopters are much more sensitive in response to any input to their primary flight controls and said inputs are more frequent. As a matter of fact with regard to primary flight controls there are three major differences between airplanes and helicopters:

- airplanes generally have several control surfaces per degree of freedom and additionally there are several actuators available for each control surface. Thus if the control of one control surface shows any malfunction another control surface may take over instead of the deficient control surface. Contrary to airplanes helicopters have not more than one control surface per degree of freedom of the helicopter and said control of the control surface has to assure the safety of the helicopter without any backup.
- the elements of the primary flight controls have to carry much higher loads than corresponding elements of an airplane as said loads may be distributed to several corresponding elements for one control surface of an airplane, and
- airplanes generally have a certain inherent stability allowing the primary flight controls some spare time for reconfiguration in case of any malfunction. Contrary to airplanes helicopters are inherently instable requiring constant control to avoid destabilisation.

Taking into account size and complexity of mechanical primary flight controls there are considerable advantages as to weight coming with electrical primary flight controls in airplanes. Such weight advantages are not paramount for helicopters due to their concept and to the design of their fuselage. On top some flight attitudes ask high processing power as not only the pilot's commands have to be taken into consideration, but also helicopter conditions, such as angular speeds, in order to improve piloting and most of all stability of the helicopter. Such high processing power can only be provided by digital computers, said digital computers being susceptible to malfunctions originating from many causes, e.g. hardware damage, logical errors or susceptibility with regard to radiation.

All of the above mentioned difficulties hamper the introduction of electric primary flight controls in helicopters. Preferred primary flight controls for main and/or tail rotors in helicopters of the state of the art comprise:

- at least one control element such as a control stick to be handled by the pilot, said control element interacting with push and pull rods and/or cables of the mechanical primary flight controls for actuation of the control surface correspondingly,
- at least one gear element integrated into the mechanical primary flight controls and responsive to the pilot's input and the automatic pilot without any feedback to the pilot,
- resetting means, acting via a soft link, like a spring, being responsive to the pilot's input and the automatic pilot, and
- a computer determining the sequence of commands transferred to the gear element and the resetting means.

The gear element has to be able for rapid action for efficient stability. In case of any malfunction the gear element may receive a false command of the mechanical primary flight controls and the subsequent transmission to the control surface might put at risk the helicopter. To obviate said risk there are surveillance circuits, alarms, etc. The gear element is generally to slow in its operational frequency and there may be uncomfortable feedback from the actuation of the gear element to the control stick. Superposed to the actuations of the pilot are the actuations of said resetting means destined to stabilize the helicopter. The frequency of the actuations of said resetting means is for security reasons even much slower than the frequency of the actuations of said gear element. Said mechanical primary flight controls give high reliability as to their output but little comfort for the pilot compared to any electric primary flight controls. Mechanical primary flight controls are increasingly unable to correspond to the requests of modern helicopters with high profiled operations.

The document FR 2771071 A1 discloses a device using a computer to interpret control force applied by the pilot and applying relevant control to an actuator. The control for operating the control within a helicopter includes a control handle or joy stick which moves a steering linkage. This is linked to a device for operating the control. A jack is built into the steering linkage and a computer determines the control instructions which are transmitted to the jack. A sensor measures the values of a parameter representative of the force exerted by the pilot on the control handle. The computer then uses these measured values to determine the control instructions. A further mechanism is provided to apply a centering force to the control handle. Said control is entirely mechanic and uses electric surveillance to verify specific parameters.

The document FR 2761659 A1 discloses a flight controller having multiple command generation systems and multiple servo-systems, which receive flight data and flight control instructions. Each of the command generation systems generate a set of commands to direct operation of the flight control surfaces, and one at least of them performs a self-monitoring operation and generates corresponding monitoring signals. Each of the servo-systems has a selector which receives the data from the control surfaces and also the control commands. The selector operates under a set priority system, and takes account of the monitoring signal, automatically blocking any system that indicates a fault. Said controller is electric and requires a lot of redundancy to avoid malfunction with the consequence of extremely complex electric architecture to achieve a maximum of safety. Considerable fire protection means were compulsory for all the components of the controller situated in any fire hazard area with the consequence of bulky components. Costs of development for said electric flight controller were extremely high.

BRIEF SUMMARY OF THE INVENTION

A first objective of the invention is to enable the retrofitting of fly-by-wire to any existing flight controls of helicopters.

A second objective of the invention is to protect the electrical and electromechanical components of the fly-by-wire interface for the hydraulic servos of the flight control from any unfriendly environment, such as hot temperatures, inflammable fluids, high vibrations, with severe installation space limitations of the main and tail gearbox installation.

A third objective of the invention is to provide a modern, high-performance, flight control.

A fourth objective of the invention is to provide a higher frequency flight control of gearbox vibrations or aeroelastic instabilities of the rotors.

A fifth objective of the invention is to provide a method of operating such flight controls of helicopters.

The solution is provided with primary flight controls for main and/or tail rotors of helicopters with the features of claim 1 and with a method of operating such flight controls of helicopters with the features of claim 19. Preferred embodiments of the invention are presented with the subclaims.

According to the invention primary flight controls for main and/or tail rotors of helicopters with an electro-mechanical interface between on one side any of Fly-By-Wire and/or any of Fly-by-light controls and on the other side hydraulic servo actuators for control force amplification towards said main and/or tail rotor controls, comprise at least one control stick to be handled by the at least one pilot, at least one flight control computer connected to said control stick, electro motors of said electro-mechanical interface for each of said main and/or tail rotor controls, said at least one flight control computer preparing and transferring electric signals to said electro motors, and mechanical linkages from said electro-mechanical interface connecting the respective electro motors to the hydraulic servo actuators of the main and/or tail rotor controls.

For each degree of freedom of any of the main and/or tail rotor controls there is provided but one of the hydraulic servo actuators, connected by one of the mechanical linkages to said at least one electro motor. This distinguishes helicopter primary flight controls from fixed-wing aircraft where for one degree of freedom of flight controls multiple aerodynamic control surfaces may be employed. Said one hydraulic servo actuator is of the type having the one mechanical linkage connected to its input and its output. The at least one electro motor is of the direct drive type, i.e. an electro motor without any step-down gear or any other gear mechanism but possibly with a clutch, the stator of said electro motor being integral with a casing of said electro motor and its armature driving directly the tool said electro motor is supposed to drive. The position of said electro motor has a reference to said one mechanical linkage. The position of the at least one electric motor transmitted via the mechanical linkage is commanding the position of the corresponding hydraulic servo actuator and corresponding degree of freedom of the main or tail rotor controls.

The torque delivered by said at least one electro motor to the hydraulic servo actuator is related to the electrical current and consequently to the power consumption of said at least one electro motor. The at least one direct drive electric torque motor comprises an output lever and simple rotary bearings but can do without gearbox, thus allowing a reduction of risk of jamming of the mechanical drive train by simplicity of mechanical design designed to be very improbable to jam.

The inventive primary flight controls for the main and/or tail rotor controls of a helicopter combine the advantage of integration of a simple electric system with a classic mechanic control. Triple mechanical linkage, as described in FR 2603866, is obsolete with the inventive primary flight controls. Said triple mechanical linkage would anyway not be an option for the control of helicopters because of lack of installation space and due to the excessive mass of such a triple mechanical linkage. Existing helicopters provided with hydraulic servo actuators controlled by mechanical linkage from the pilot simply need to be equipped with an electric system between control stick and mechanical linkage allowing reduction of qualification work, if said inventive primary flight controls for fly-by-wire/light are newly installed in a helicopter replacing mechanical flight controls.

For this reason, the inventive primary flight controls allow retrofitting of fly-by-wire/light to helicopters with hydraulic servo actuators for the main and/or tail rotor controls. A further advantage of the invention lies in the simple and highly reliable, exclusively mechanical position feed-back loop mechanic control of the hydraulic servo actuators providing a non-ambiguous correlation of the position of the respective output of the hydraulic servo actuators with the commanded position by the mechanical linkages, i.e. with the respective angular position of said electro motors. The exclusively electric or electronic control of the electro motors ensures the correlation between the command of the pilot and the respective angular position of said electro motors providing the advantages of reduced weight and improved flexibility of electric control to the inventive primary flight controls while ensuring the reliability requested for the control of main and/or tail rotors of helicopters without any supplemental sensors for the position output of the hydraulic servo.

The inventive primary flight controls therefore allow a less complicated position feed-back loop because a mechanical servo feedback mechanism of hydraulic actuators is used. Thus, redundant electrical position sensors for hydraulic actuator are not necessary, leading to reduction of complexity, size and cost. The inventive primary flight controls further allow the detection in real time of the position of any of the controls as the mechanical linkage—of for example push and pull rods or cables—allows to establish a non-ambiguous correlation between an electro motor and an attached hydraulic servo actuator. The torque transmitted by the electro motor to said attached hydraulic servo actuator allows assessment of the operating condition of the attached hydraulic servo actuator, i.e. it is possible to assess by means of the detected electric consumption of the electro motor whether the attached hydraulic servo actuator is working properly or not, e.g. with degraded performance due to leakage or loss of hydraulic supply.

In case the electro motor does not work or works in an asynchronous way said defect is detected by the inventive primary flight controls and the defective component may be inactivated or by passed. A further advantage of the inventive primary flight controls is that the mechanical linkage allows variable separation of the location of the at least one electro motor from the attached hydraulic servo actuator thus allowing for example to locate the at least one electro motor outside of any fire hazard areas close to engines in the helicopter and away from hot gearboxes thus allowing to use less protected and therefore less complex electro motors with reduced weight and reduced costs for main rotors of helicopters. The separation of the location of the at least one electro motor from the attached hydraulic servo actuator allows the application of the inventive primary flight controls to a tail-rotor with a so called "Fenestron", namely a tail rotor of a helicopter that is essentially a ducted fan with a housing integral with the tail skin. The inventive primary flight controls allows the hydraulic servo actuator to be integrated in the "Fenestron" said hydraulic servo actuator being linked by means of the mechanical linkage to the at least one electro motor in the fuselage or tail boom of a helicopter with the advantages of electric controls.

According to a preferred embodiment of the invention the electro-mechanical interface comprises a smart interface actuator preferably composed of smart interface actuator control electronics and said electro motor. Said smart interface actuator is connected to the mechanical command interface of the control valve of hydraulic actuators providing a modular electro electro-mechanical interface between the Fly-By-Wire and/or any of Fly-by-light controls and the hydraulic servo actuators. In conjunction with the FBW electronic linkage of the flight control computer, said smart interface actuator substitutes the mechanical primary flight control linkage between pilot controls, such as control sticks, pedals, etc. and hydraulic actuators. At the same time said smart interface actuator allows the reuse of any hydraulic servo actuators already installed in the helicopter without any modification in the case of retrofit of FBW to existing helicopters. A further advantage of the inventive primary flight controls with a smart interface actuator is that tests of the inventive primary flight controls at the ground may be accomplished. In case of a hydraulic deficiency of any of the hydraulic servo actuators the smart interface actuator is able to inform the pilot via the Fly-By-Wire and/or any of Fly-by-light controls and the dashboard.

According to a further preferred embodiment of the invention the smart interface actuator control electronics comprise smart interface actuator control means with preferably monitoring means and smart interface actuator electronics means with preferably power means.

According to a further preferred embodiment of the invention the smart interface actuator control electronics and the electro-motors are redundant internally for reasons of safety and availability.

According to a further preferred embodiment of the invention the electro-motors are physically dissimilar in order to avoid common errors for all motors.

According to a further preferred embodiment of the invention the control/command means with preferably monitoring means and/or power means are dissimilar in order to avoid common errors for all means.

According to a further preferred embodiment of the invention there is a one way data transfer from the smart interface actuator control means to the smart interface actuator electronics means and a one way data transfer from the smart interface actuator electronics means to the electro motor except for the data related to the position of said electro motor and the data related to the power consumption of said electro motor. The data related to the position of said electro motor and the data related to the power consumption of said electro motor are fed back to the smart interface actuator electronics means to inform the pilot via the Fly-By-Wire and/or any of Fly-by-light controls and the dashboard thus providing the necessary fail safe redundancy with a simple, light weight and therefore economic electric architecture.

According to a further preferred embodiment of the invention the smart interface actuator control means exchanges data with said at least one flight control computer using a multitude of sensors from a power surface interface, the smart interface actuator electronics means and the smart interface actuator motor for monitoring of status & health and providing feed-back control.

According to a further preferred embodiment of the invention the electro motor is of the brushless torque motors type applied as direct drive without mechanical gearboxes allowing improved functionality once the hydraulic supply is stopped before start-up or after shut-down of the helicopter, replacing the function of any elastic rods as known from the state of the art using irreversible actuators.

According to further preferred embodiments of the invention the power consumption of the electro motor is evaluated by command/monitoring means and transmitted to said at least one flight control computer as corresponding to the torque of the electric motor transmitted equivalent to input force of the hydraulic servo and/or the position of said electro motor is transmitted to said at least one flight control computer as corresponding to a position of the hydraulic servo actuator. Thus the pilot at the dashboard is able to control and survey the inventive primary flight controls by means of the smart interface actuator for the main and/or tail rotor controls. The inventive primary flight controls allow continuous build-in test in normal, degraded and emergency operating modes of the smart interface actuator during flight of the helicopter by exploiting sensors of the electro motor indicating its position and by exploiting the smart interface actuator electronic means indicating the motor current allowing to monitor the state of any of the hydraulic servo actuators. The indication of position and motor current of the electro motor allows to detect jamming of a hydraulic control valve of an attached hydraulic servo actuator allows to detect any degradation of hydraulic servo actuators and prevent any unnoticed reduced force amplification capabilities or reduced speed of the hydraulic servo.

The smart interface actuator allows to detect when commanded speed exceeds the capabilities of degraded speed performance of the hydraulic servo or commanded position cannot be reached by the hydraulic servo resulting from degraded force amplification resulting e.g. from loss of one hydraulic supply. As a further advantage of the inventive primary flight controls a "Power Up Built-in Test" (PBIT) allows to verify the operability of the equipment before flight. Said PBIT may be executed before flight in order to exclude the possibility of jamming and/or to minimize the probability of jamming of any mechanical parts of the electro motor as far as possible during the subsequent flight operations: e.g. detection of slowly increasing friction in old/degrading bearings.

As a still further advantage of the invention an on condition maintenance is possible allowing repair or replacement of components of the inventive primary flight controls in case of actual damage or predicted failure in the near future. Furthermore, the inventive primary flight controls includes standard control and monitoring to guarantee maximum possible performance during flight, even if failures occur by appropriate failure management e.g. by switching off one motor or power electronics in case of short circuit. This includes flight after a failure has been detected on ground, e.g. during pre-flight test and the pilot has decided to fly according to Minimum Equipment List (MEL) conditions.

According to a further preferred embodiment of the invention there is provided a multiplicity of power supply buses to supply power to the smart interface actuator, said power supply buses being connected to the helicopter's electric grid.

According to a further preferred embodiment of the invention there is provided a multiplicity of interfaces and monitoring buses to connect the smart interface actuator to the flight control computer.

According to a further preferred embodiment of the invention the smart interface actuator control means are provided with a multitude of sensors for said power supply buses, smart interface actuator electronics means and said electro motor.

According to a further preferred embodiment of the invention the electro motor is a direct drive torque motor without mechanical gears.

According to a further preferred embodiment of the invention the smart interface actuator includes clutches between motors and mechanical linkage for jam-tolerance limiting torque input in case of hardover/powered runaway and for easier certification.

According to a further preferred embodiment of the invention the electro motor is a direct drive linear motor or direct drive rotary motor with advantages in case of restricted installation space available.

According to a further preferred embodiment of the invention a redundant electro motor is provided with redundant mechanical linkage arrangement for jam-tolerance allowing speed summing and torque summing. Said redundancy arrangement is suitable to allow easier certification.

According to a further preferred embodiment of the invention the smart interface actuator uses at least one additional position sensor at the output of the hydraulic servo actuator which is evaluated in real time to improve the control of the at least one electric motor. By measurement of the exact position of the hydraulic servo output the control electronics can reduce positioning inaccuracies and improve accuracy of the flight controls, especially reduce phase lag and time delay during highly dynamic operation of the flight controls to compensate high frequency motion of a gearbox relative to a roof of a cabin where the smart interface actuator is installed or to compensate high frequency aeroelastic instabilities.

According to a further preferred embodiment of the invention the smart interface actuator uses at least one additional position sensor at the input of the hydraulic servo actuator which is evaluated in real time to compensate high frequency motion of the gearbox relative to the roof of the cabin where the smart interface actuator is installed.

According to a preferred embodiment of the invention a method is provided of operating the primary flight controls of a helicopter by Inputting a command by means of a control stick, Transforming said command to electric signals, Transferring said signals by the flight control computer to set-point values for the main and/or tail rotor controls, Transforming the electrical command of the set-point value in at least one electric motor to a mechanical input command at a control valve of a hydraulic servo actuator, and controlling the parameters of the at least one electric motor by smart interface actuator control electronics.

According to a further preferred embodiment of the invention the mechanical linkage uses push/pull rods and/or bellcranks to transmit mechanically the command motion from an output of the at least one electro motor to the separated control valve input of the hydraulic servo actuator.

According to a further preferred embodiment of the invention the electrical current of the at least one electric motor is evaluated in real time to detect jamming of the hydraulic servo actuator, to detect degradation of performance of the hydraulic servo actuator, including degradation or loss of hydraulic power supply or to compensate high frequency aeroelastic instabilities or motion of a gearbox relative to a roof of a cabin where the smart interface actuator is installed.

According to a further preferred embodiment of the invention the displacement of the at least one electric motor is evaluated in real time to detect degradation of performance of the hydraulic servo actuator, including degradation or loss of hydraulic power supply and to compensate high frequency aeroelastic instabilities or motion of the gearbox relative to the roof of the cabin where the smart interface actuator is installed.

According to a further preferred embodiment of the invention at least one position sensor at a mechanical input of the hydraulic servo actuator is evaluated in real time to compensate high frequency motion of the gearbox relative to the roof of the cabin where the smart interface actuator is installed.

According to a further preferred embodiment of the invention at least one position sensor at a mechanical output of the hydraulic servo actuator is evaluated in real time for high frequency compensation of aeroelastic instabilities.

BRIEF DESCRIPTION OF THE SEVERAL VIEWS OF THE DRAWINGS

A preferred principle of the invention will be described in greater detail in the following, with reference to the drawing for exemplary purposes. In the drawings.

DETAILED DESCRIPTION OF THE INVENTION

Figure 1:
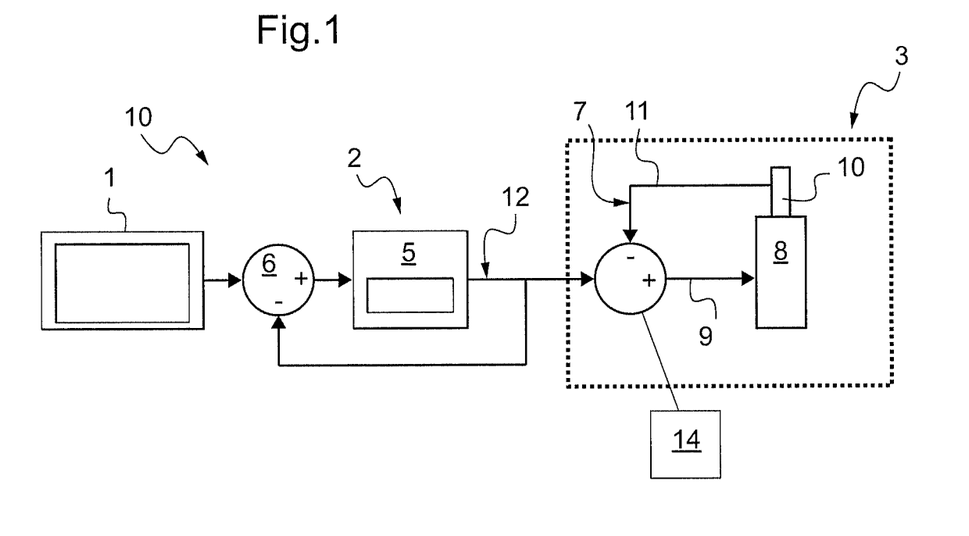
FIG. 1 shows a schematic diagram of a primary flight controls according to the invention.

According to FIG. 1 a principle sketch of a primary flight controls 10 represents a flight control computer 1 controlling an electro-mechanical interface between on one side an electric part 2 and on the other side a mechanical part 3 of said electro-mechanical interface for control force amplification towards main and/or tail rotor controls 4.

The flight control computer 1 is connected to a control stick (not shown) for handling by the pilot.

The electric part 2 of the electro-mechanical interface comprises the control/command and power electronics 6 as well as monitoring means connected via Fly-By-Wire and/or any of Fly-by-light controls to the flight control computer 1 connected to said control stick. The electric part 2 comprises as well at least one electro motor 5 supplied by said power electronics 6 for each degree of freedom of said main and/or tail rotor controls 4. Said at least one flight control computer 1 prepares and transfers electric signals to said at least one electro motor 5 via a smart interface actuator linked to the flight control computer 1 of the primary flight controls 10. The electric part 2 is supplied with electric power by the helicopter's onboard electric grid. The at least one electro motor 5 is of the direct drive type without mechanical gears.

The mechanical part 3 of the electro-mechanical interface of the primary flight controls 10 comprises for each degree of freedom of the main and/or tail rotor controls 4 one mechanical linkage 7 from said at least one electro-motor 5 to a hydraulic servo actuator 8 of the main and/or tail rotor controls 4. The mechanical linkage 7 comprises push and pull rods 9 connected to an input and push and pull rods 11 connected to an output of the hydraulic servo actuator 8, each of said push and pull rods 9, 11 being mechanically linked to an output 12 of a defined angular position of a rotor relative to a stator of said at least one electro motor 5. The angular position 12 of said at least one electro motor 5 and therefore as well the corresponding position of said one mechanical linkage 7 indicate the position commanded by said at least one electro motor 5 to the hydraulic servo actuator 8 for said degree of freedom of the main and/or tail rotor controls 4, the torque needed to command the hydraulic servo actuator 8 via the mechanical linkage 7 being related to the electrical current of said at least one electro motor 5. The data with the power consumption and the angular position 12 of said at least one electro motor 5 are fed back to the flight control computer 1.

Figure 2:
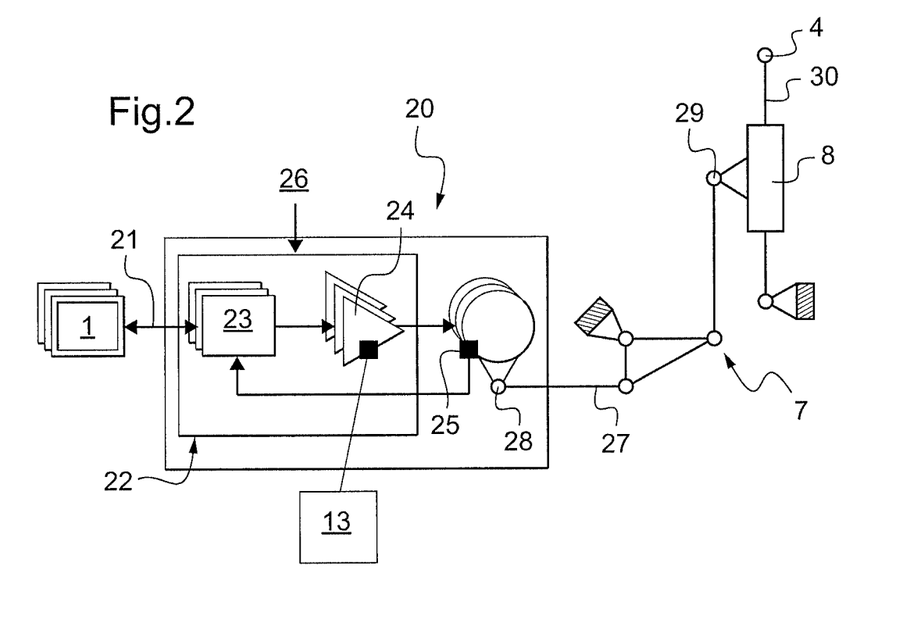
FIG. 2 shows a schematic view of a first embodiment of the primary flight controls according to the invention.

According to FIG. 2 corresponding features are referred to with the references of FIG. 1. The electro-mechanical interface of the primary flight controls 10 is shown with its electric part 2 and its mechanical part 3 in more detail. The electric part 2 is provided with the smart interface actuator 20 linked to the flight control computer 1 via a multiplicity of interfaces, control and monitoring buses 21. The smart interface actuator 20 is composed of smart interface actuator control electronics 22 and said at least one electro motor 5. The smart interface actuator control electronics 22 and the electro motors 5 are redundant internally.

Control data are exchanged both ways between the smart interface actuator control electronics 22 and the flight control computer 1. The smart interface actuator control electronics 22 comprise smart interface actuator control means 23 with monitoring means and smart interface actuator electronics means 24 with power means. Command data from the flight control computer 1 are transferred one way from the smart interface actuator control means 23 towards the smart interface actuator electronics means 24 and to the at least one electro motor 5.

A multiplicity of power supply buses 26 are provided to supply power to the smart interface actuator 22, said power supply buses 26 being connected to the helicopter's electric grid (not shown). The amplified power from the smart interface actuator electronics means 24 is supplied to the at least one electro motor 5.

A sensor 25 detects the angular position of an armature relative to a stator of said at least one electro motor 5 and the data related to said angular position 12 of said at least one electro motor 5 are fed back to the smart interface actuator control means 23 and smart interface actuator electronics means 24 of the smart interface actuator electronics 22. Data related to the power consumption of said at least one electro motor 5 are fed from the smart interface actuator electronics means 24 back to the smart interface actuator control means 23. The data related to the angular position 12 and power consumption of said at least one electro motor 5 are fed back from the smart interface actuator control means 23 to the flight control computer 1 for further transfer of said data to a pilot's dashboard (not shown).

The mechanical part 3 of the electro-mechanical interface is mechanically connected with a lever 27 of the mechanical linkage 7 to a flange 28 of the armature of the at least one electro motor 5, said mechanical linkage 7 being mechanically connected to a control valve's flange 29 as a mechanical input of the hydraulic servo actuator 8. The output 30 of the hydraulic servo actuator 8 towards the main and/or tail rotor controls 4 is provided with an internal mechanical connection (not shown) to the flange 29 of the hydraulic servo actuator 8.

Figure 3:
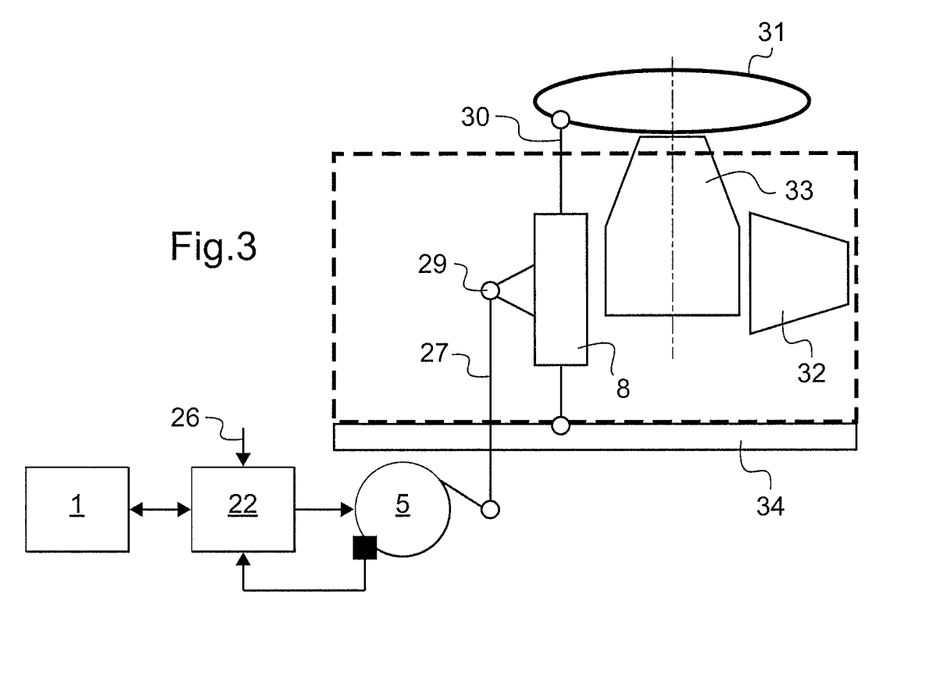
FIG. 3 shows a schematic view of a further embodiment of the primary flight controls according to the invention.

According to FIG. 3 corresponding features of the primary flight controls 10 are referred to with the references of FIGS. 1 and 2. The electro-mechanical interface with an electric part 2 separated from its mechanical part 3 is applied to the main rotor controls 4 of a helicopter. The output 30 of the hydraulic servo actuator 8 of the mechanical part 3 is connected to a swash plate 31 of the main rotor controls 4. The main rotor (not shown) is driven by an engine 32 by means of an adjacent gearbox 33.

Any fire hazard implied by the engine 32 is isolated by a fire wall 34 from the electric part 2 of the electro-mechanical interface with the smart interface actuator electronics 22, the at least one electro motor 5 and the flight control computer 1. Mechanic control of the hydraulic servo actuator 8 is provided by the mechanical linkage 7 between the at least one electro motor 5 and the hydraulic servo actuator 8 with the lever 27 passing through the fire wall 34.

A method for operation of the primary flight controls 10 is now described.

A pilot's command by means of a control stick is transformed to electric signals and transferred by the flight control computer 1 to set-point values for the main and/or tail rotor controls 4 of the helicopter, so far corresponding to fly-by-wire.

The at least one electric motor 5 transforms the electrical command of a set-point value to a mechanical input command at the control valve 29 of the hydraulic servo actuator 8. The parameters of the at least one electric motor 5 are controlled by the smart interface actuator control electronics 22.

The mechanical linkage 7 consisting of push/pull rods and/or bellcranks 27 is used to transmit mechanically the command motion from the output of the at least one electro motor 5 to actuate the separated control valve input 29 of the hydraulic actuator 8.

In case of a single jam of the hydraulic control valve 29 an increasing static force of operation is monitored through an increased continuous current consumed by the at least one electro motor 5 at a given angular position of the armature. Said increased continuous current is detected by the smart interface actuator 20. As said increased continuous current corresponds directly to the torque needed to operate the jammed hydraulic control valve 29, the increased continuous current can be used to detect any jam of the hydraulic control valve 29 during flight or pre-flight test.

The smart interface actuator 20 of the primary flight controls 10 detects if any speed commanded by the smart interface actuator 20 exceeds the capabilities of a degraded performance of the hydraulic servo actuator 8 or a commanded position cannot be reached by the hydraulic servo actuator 8 as a result from degraded force amplification as e.g. resulting from loss of hydraulic supplies. In such a case the mechanical command linkage 7 to the hydraulic servo actuator 8 would run into the end stops of the hydraulic valve mechanical input 29. As a result the instantaneous electrical current corresponding to the at least one electro motor's 5 instantaneous torque would increase due to the impact. The increase of electrical current would be measured by at least one current sensor 13 as part of the power means 24 and the resulting signal would be transmitted to the control electronics 23 for further processing. A corresponding positioning error of the hydraulic servo actuator 8 would be detected via the electro motor rotational position sensor 25 because the mechanical end stops of the hydraulic valve input will limit the electro motor motion.

Before power-up or after power-down of the hydraulic system, the at least one electric motor 5 cannot move the hydraulic valve input 29 due to excessive loads of the swashplate 31 because of missing force amplification support by the hydraulic servo actuators 8. By means of the smart interface actuator 20 said feature can be used to effect a Power Up Built-in Test to verify the operability of the primary flight controls 10 before flight.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Primary flight controls for main and/or tail rotors of helicopters with an electro-mechanical interface between any of fly-by-wire and/or of fly-by-light controls and hydraulic servo actuators said fly-by-wire and/or of fly-by-light controls commanding the position of the hydraulic servo actuators towards said main and/or tail rotor controls, comprising
    at least one control stick to be handled by the at least one pilot,
    at least one flight control computer connected to said control stick,
    at least one electro motor of said electro-mechanical interface for each of said main and/or tail rotor controls, said at least one flight control computer preparing and transferring electric signals to said at least one electro motor, and
    mechanical linkages of said electro-mechanical interface connecting the at least one electro motor to the hydraulic servo actuators of the main and/or tail rotor controls,
    wherein for each of the main and/or tail rotor controls there is provided but one of the hydraulic servo actuators, connected by one of the mechanical linkages to said at least one electro motor, said one hydraulic servo actuator being of the type having the one mechanical linkage connected to its input and its output and the at least one electro motor being directly linked to the mechanical linkage, the position of said at least one electro motor having a reference to said one mechanical linkage and the torque delivered by said at least one electro motor to the hydraulic servo actuator being related to the power consumption of said at least one electro motor.

2. The primary flight controls according to claim 1, wherein the electro-mechanical interface comprises a smart interface actuator preferably composed of smart interface actuator control electronics and said at least one electro motor.

3. The primary flight controls according to claim 2, wherein the smart interface actuator control electronics comprises smart interface actuator control means with preferably monitoring means and smart interface actuator electronics means with preferably power means.

4. The primary flight controls according to claim 3, wherein the smart interface actuator control electronics and the electro-motors are redundant internally.

5. The primary flight controls according to claim 4, wherein the electro-motors are physically dissimilar.

6. The primary flight controls according to claim 3, wherein there is a one way data transfer from the smart interface actuator electronics means to the at least one electro motor except for the data related to the angular position of said at least one electro motor and the data related to the power consumption of said at least one electro motor.

7. The primary flight controls according to claim 3, wherein the smart interface actuator control means exchanges data with said at least one flight control computer.

8. The primary flight controls according to claim 1, wherein the at least one electro motor is of the brushless type.

9. The primary flight controls according to claim 1, wherein at least one sensor is provided to measure the electrical current of the respective associated electro motor for analysis of the power consumption of the respective associated electro motor by the flight control computer in real time at a dashboard.

10. The primary flight controls according to claim 1, wherein the position of said at least one electro motor is transmitted to said at least one flight control computer as position of the hydraulic servo actuator.

11. The primary flight controls according to claim 2, wherein there is provided a multiplicity of power supply buses to supply power to the smart interface actuator, said power supply buses being connected to the helicopter's electric grid.

12. The primary flight controls according to claim 2, wherein there is provided a multiplicity of interfaces and monitoring buses to connect the smart interface actuator to the flight control computer.

13. The primary flight controls according to claim 3, wherein the smart interface actuator control means are provided with a multitude of sensors from said power supply buses, smart interface actuator electronics means and said electro motor.

14. The primary flight controls according to claim 1, wherein the at least one electro motor is a direct drive torque motor with at least one clutch between the at least one electric motor and the mechanical linkage.

15. The primary flight controls according to claim 1, wherein the at least one electro motor is a direct drive linear motor or a direct drive rotary motor.

16. The primary flight controls according to claim 1, wherein a redundant electro motor is provided with redundant mechanical linkage arrangement.

17. A method of operating the primary flight controls of a helicopter comprising the steps of:
    inputting a command by means of a control stick,
    transforming said command to electric signals,
    transferring said signals by a flight control computer to set-point values for main and/or tail rotor controls,
    transforming an electrical command of a set-point value in at least one electric motor to a mechanical input command at a control valve of a hydraulic servo actuator, and
    controlling the parameters of the at least one electric motor by smart interface actuator control electronics.

18. The method according to claim 17, comprising the step of using a mechanical linkage of push/pull rods and/or bellcranks to transmit mechanically a command motion from an output of the at least one electric motor to a separated control valve input of the hydraulic servo actuator.

19. The method according to claim 17, comprising the step of evaluating electrical current of the at least one electric motor in real time.

20. The method according to claim 17, comprising the step of evaluating displacement of the at least one electric motor in real time.

* * * * *